March 7, 1950 D. B. PARKINSON 2,499,606

PRESET TYPE TELEPHONE DIALER WITH PULSE GENERATING TRANSFORMERS

Filed July 16, 1948 4 Sheets-Sheet 1

INVENTOR
D. B. PARKINSON
BY William F. Simpson.
ATTORNEY

March 7, 1950 D. B. PARKINSON 2,499,606

PRESET TYPE TELEPHONE DIALER WITH PULSE GENERATING TRANSFORMERS

Filed July 16, 1948 4 Sheets-Sheet 2

INVENTOR
D. B. PARKINSON
BY William F. Simpson
ATTORNEY

March 7, 1950 D. B. PARKINSON 2,499,606

PRESET TYPE TELEPHONE DIALER WITH PULSE GENERATING TRANSFORMERS

Filed July 16, 1948 4 Sheets-Sheet 3

INVENTOR
D. B. PARKINSON
BY William F. Simpson
ATTORNEY

GENERATION OF START PULSES

GENERATION OF PULSES REPRESENTING DIGIT 1

GENERATION OF PULSES REPRESENTING DIGIT 2

GENERATION OF PULSES REPRESENTING DIGIT 0

THE START PULSES AND PULSES REPRESENTING THE DIGIT 2 AS APPLIED TO THE LINE DURING ONE CYCLE OF THE EXCITATION CURRENT

INVENTOR
D. B. PARKINSON
BY William F. Simpson.
ATTORNEY

Patented Mar. 7, 1950 2,499,606

UNITED STATES PATENT OFFICE 2,499,606

PRESET TYPE TELEPHONE DIALER WITH PULSE GENERATING TRANSFORMERS

David B. Parkinson, Maplewood, N. J., assignor to Bell Telephone Laboratories, Incorporated, New York, N. Y., a corporation of New York Application July 16, 1948, Serial No. 39,015

14 Claims. (Cl. 179—90)

This invention relates to signaling apparatus and more specifically to telephone signaling apparatus of the preset type which generates pulses of electric current which may be transmitted over voice frequency channels.

In the usual type telephone signaling apparatus each digit is selected and transmitted in sequence and the selection of each successive digit cannot be made until the signaling pulses representing the preceding digit have been transmitted, thereby requiring an appreciable amount of time and presenting numerous opportunities for the subscriber or operator to err. Each sequence of signaling pulses representing a called number is transmitted only once, so if any error occurs in the selection or transmission, a wrong number will result. Furthermore, the usual type telephone signaling apparatus employs representations of digits comprising interruptions of direct current which must be transmitted over a direct current or an extremely low frequency transmission channel. Pulses of this type cannot be transmitted directly over the usual voice frequency channels and repeaters as employed in telephone systems. Also, the usual telephone central office switching systems require the signals to be stored in expensive and complicated equipment to be subsequently transmitted to another switching center, and often this process must be repeated several times.

An object of this invention is to provide signaling equipment in which the entire number to be called may be set by the subscriber or operator prior to initiating the call and in which the signals representing the number are generated at a high rate of speed. Such an arrangement reduces the time and attention required by the subscriber or operator, reduces the opportunity for error, and reduces the holding time of the equipment at the switching center, thereby materially reducing the cost of handling calls. Another object of this invention is to provide signaling equipment for generating pulses suitable for transmission over voice frequency communication channels and in which the pulses representing the called number may be repeatedly transmitted without further attention on the part of the operator, thereby permitting the use of central office switching systems which complete the desired connection without requiring the signals to be stored. By generating pulses which may be transmitted over a voice frequency transmission path and repeating the entire number over and over, it is possible to transmit the number from a subscriber station to each of the switching devices or stations necessary to extend the transmission path to the called subscriber station.

A feature of this invention relates to signaling apparatus for generating pulses in which the magnitude of each digit of the number called is represented by the time elapsing between a reference or start pulse and a stop or digit pulse. In transmitting pulses of short duration over voice frequency transmission paths, difficulty is frequently encountered due to transients set up by the pulses. The transients are usually decaying alternating currents which are caused by resonant circuits encountered in the transmission paths, repeat coils, filters, and other transmission equipment. Transients resulting from the application of short pulses to such equipment frequently last a number of cycles and thus for an appreciable interval of time after the exciting pulse has terminated. This invention discloses apparatus adapted to space the signaling pulses so that ample time is allowed for the transients associated with or appearing incident to the application of each of the signaling pulses to the transmission system to die out sufficiently so that they will not interfere with the next signaling pulse. In this manner it is possible to prevent interaction between the various pulses representing the digits of the called number so that the number may be correctly received by the equipment at the central switching station.

These and other objects and features of the invention will be apparent from the following description, the appended claims, and the drawings, in which:

Figure 10:
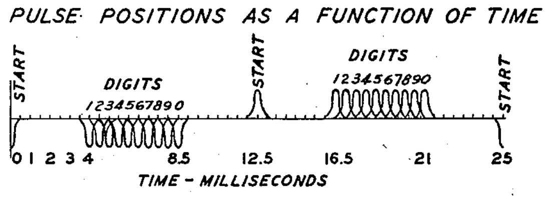
Figure 10A:
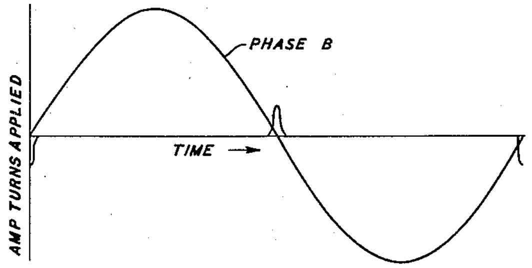
Figure 10B:
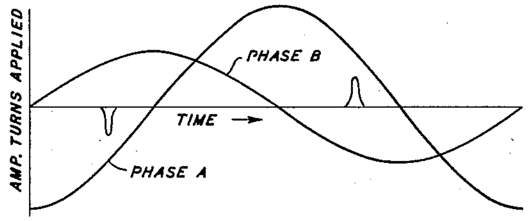
Figure 10C:
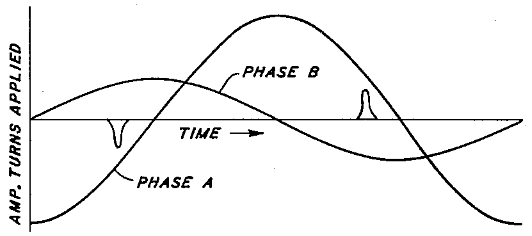
Figure 10D:
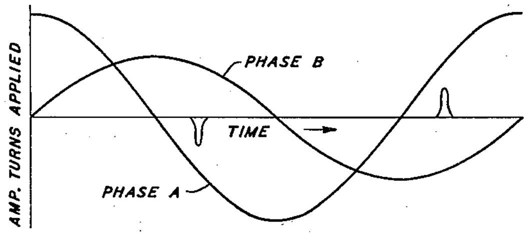
Figure 10E:
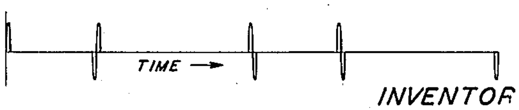

Fig. 10 indicates the pulse positions as a function of time;

Fig. 10A indicates the start pulses generated in the secondary winding and the ampere-turns in the primary winding of the transformer for generating the start pulses during one cycle of the excitation current;

Fig. 10B indicates the stop pulses generated in the secondary winding and the ampere-turns in each of the primary windings of the transformer for generating the pulses representing the digit 1 during one cycle of the excitation current;

Fig. 10C indicates the stop pulses generated in the secondary winding and the ampere-turns in each of the primary windings of the transformer for generating the pulses representing the digit 2 during one cycle of the excitation current;

Fig. 10D indicates the stop pulses generated in the secondary winding and the ampere-turns in each of the primary windings of the transformer for generating the pulses representing the digit 0 during one cycle of the excitation current; and Fig. 10E indicates the start pulses and the stop pulses representing digits 1, 2 and 0 as generated during one cycle of the excitation current.

The manner in which the apparatus disclosed in this application may be incorporated in a complete telephone system is disclosed in copending application Serial No. 35,925, filed June 29, 1948, by W. A. Malthaner. Suitable types of equipment for responding to the signaling pulses transmitted from the apparatus disclosed herein are disclosed in the copending applications of H. E. Vaughan, Serial No. 35,911, filed June 29, 1948; and W. A. Malthaner, N. D. Newby, and H. E. Vaughan, Serial No. 35,924, filed June 29, 1948.

A similar signaling device is disclosed in copending applications Serial No. 35,930, filed June 29, 1948, by D. B. Parkinson; Serial No. 35,927, filed June 29, 1948, by C. A. Lovell, and Serial No. 35,926, filed June 29, 1948, by C. A. Lovell and D. B. Parkinson. Reference may be made to application Serial No. 35,930 of D. B. Parkinson for a more detailed description of the time relationship between the various pulses.

Novel features of the signaling or dialing system disclosed, but not claimed herein, are claimed in different ones of the above-identified applications.

In the exemplary embodiment shown, provision is made for the generation of pulse representations of eight characters during each cycle of operation, and these pulses are repeatedly generated as long as the excitation current is applied. Any arbitrarily chosen number of representations of characters (within reasonable limits) may be generated by properly designed signaling apparatus. A maximum of eight representations of characters was selected for this disclosure since eight-character calling numbers are in common use in telephone systems. It will be understood that these characters may be digits or letters or a combination of the two as commonly used in designating telephone calls. Each of the digits 0 to 9 will be represented by a different combination of two pulses, the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words each transmitted pulse of approximately 1 millisecond duration is in effect lengthened to a decaying alternating current of approximately 3½ milliseconds duration. At the end of this 3½ milliseconds period or any time thereafter a second pulse may be transmitted.

The signaling system employed in this embodiment of the invention comprises a start pulse of 1 millisecond duration for each character, the start pulses being generated at 12½ milliseconds intervals as long as the pulsing transformers are energized, and a stop pulse of 1 millisecond duration for each character, each stop pulse reaching its peak value during the 4 to 8½ milliseconds interval of time after the start pulse has reached its peak value. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which reaches its peak value 4 milliseconds after the start pulse reaches its peak value, digit 2 is represented by a start pulse followed by a stop pulse which reaches its peak value 4½ milliseconds after the start pulse reaches its peak value, and so on. It will be observed that the stop pulse for the digit 0 reaches its peak value 8½ milliseconds after its start pulse and 4 milliseconds before the next succeeding start pulse. Thus, there is required an increment of time of 4 milliseconds for the decay of the start pulse, 9 increments of time of ½ millisecond each for the generation of a pulse at any one of the ten times necessary to represent the various digits, and a last increment of time of 4 milliseconds, all of the latter being required to permit a stop pulse to decay only if it should occur at the end of the ninth increment of time. Consequently, 12½ milliseconds of time elapse between the start pulses of succeeding digits, from which it follows that 12½ milliseconds is required in this exemplary system to transmit each character designating the called number. In order to indicate the starting point of the transmission of a called number, a time interval of approximately 25 milliseconds during which no pulses are transmitted is provided at the beginning of each pulse representation of a called number. Thus, a time interval of 125 milliseconds is required to transmit each eight-digit called number and the corresponding no-signal period.

In accordance with this exemplary embodiment of the invention the signaling pulses are generated by saturation-type pulse generating transformers. There are eleven pulsing transformers, one for each of the digits 0 to 9 and one for the start or reference pulse. The excitation current for the apparatus is transmitted from a power station at the central office over the line which interconnects the signaling station with the central office. This current is an alternating current of sinusoidal wave form, and at the signaling station the current is passed through a phase shifting network so that the current is converted to a two-phase source in which the two currents are 90 degrees out of phase.

Each of the pulse generating transformers has a single-winding secondary and all but one of the transformers have a two-winding primary. The primary windings of the transformers are serially interconnected and connected with the two phases of the excitation current so that one phase of the excitation current is applied to one primary winding of each transformer and so that the other phase of the excitation current is applied to the other primary winding of each transformer, with the exception that the primary of the transformer which has only one primary winding is connected to only one phase of the excitation current. The secondary windings of the transformers are connected across the line through a selector switch and distributor.

The magnetic core of each transformer is designed to be saturated except for very small values of ampere-turns, and an electric pulse is generated in the secondary winding of each transformer when the flux is changed from saturation at one polarity to saturation at the other polarity. The flux generated in the core of the transformer with a single primary winding is in phase with the phase of the excitation current which is applied to that transformer. The flux generated in the core of each transformer with two primary windings depends upon the number of turns in the two primary windings of the transformer and upon the current flowing in each winding. In this embodiment of the invention the maximum value of the currents in the circuits associated with each phase are equal. Thus, the flux generated in the core of each transformer with two primary windings depends upon the number of turns in the primary windings of the transformer and upon the time-phase relationship between the currents flowing in the primary windings. The pulse attains a maximum value when the flux is changing most rapidly which under the assumed condition of sine wave excitation is when the flux passes through zero.

For this signaling system it is necessary that all pulses be substantially alike as to wave form and amplitude and that each combination of two pulses representing a digit be of the same polarity. The area under a voltage-time curve representing the pulse is proportional to the total change in flux and to the number of turns in the secondary winding. High intensity energization will produce a high, short pulse, while lower energization will produce a wider pulse having the same area. Thus, if all pulses are to be alike the total maximum ampere-turns on each core must be equal. Assuming equal maxima in the currents of the two phases this gives $$\sqrt{N_A^2+N_B^2}=\text{a constant}$$

for each transformer, where $N_A$ is the number of turns in the primary winding of the transformer which is connected to phase A of the excitation current and $N_B$ is the number of turns in the other primary winding of the same transformer which is connected to phase B of the excitation current. If these conditions are met and if the cores and secondary windings of all the transformers are alike the pulses will be suitable for signaling purposes.

In order to cause each transformer to generate a pulse at a suitable time during each half-cycle of the excitation current, the total ampere-turns driving flux through the transformer cores must be controlled so that the flux in each transformer is zero at the time assigned to the pulse which that transformer serves to generate. This means that $$N_AI_A-N_BI_B=0$$

must be satisfied at the time the pulse is a maximum, where $N_A$ and $N_B$ are as defined above and $I_A$ and $I_B$ are the currents through $N_A$ and $N_B$, respectively. If each phase of the excitation current is of sinusoidal wave form and both phases of equal maximum amplitude, then the timing is determined by the turns ratio as follows:

$$I_A=I_0 \sin \omega t$$
$$I_B=I_0 \sin \omega t$$

and substitution gives $$N_AI_0 \sin \omega t-N_BI_0 \cos \omega t=0$$

or $$\frac{N_B}{N_A}=\tan \omega t$$

where $I_A$, $I_B$, $N_A$ and $N_B$ are as defined above, $I_0$ is the maximum current supplied by each phase of the excitation current, $\omega$ equals the frequency in cycles per second multiplied by $2\pi$, and $t$ is the time in seconds.

Thus, when the angular position of the desired pulse is fixed in relation to each half cycle of the excitation current, the number of turns and the polarity of the winding are given by these equations.

Since the magnetic flux in each transformer is reduced to zero two times during each cycle of the excitation current, it follows that a combination of two pulses representing a digit must occur during each half cycle of the excitation current and that each combination of two pulses representing a digit are of opposite polarity to the preceding two pulses.

The excitation current also drives a stepping device which in turn operates an electrical distributor. This distributor is designed to operate at a rate of one step per half cycle of the excitation current.

A selector switch serves to interconnect the pulsing transformers with the line through the distributor. Thus, pulses representing any of the digits 0 to 9 may be impressed across the telephone line in accordance with the setting of the selector switch.

Figures 1, 2, 3:
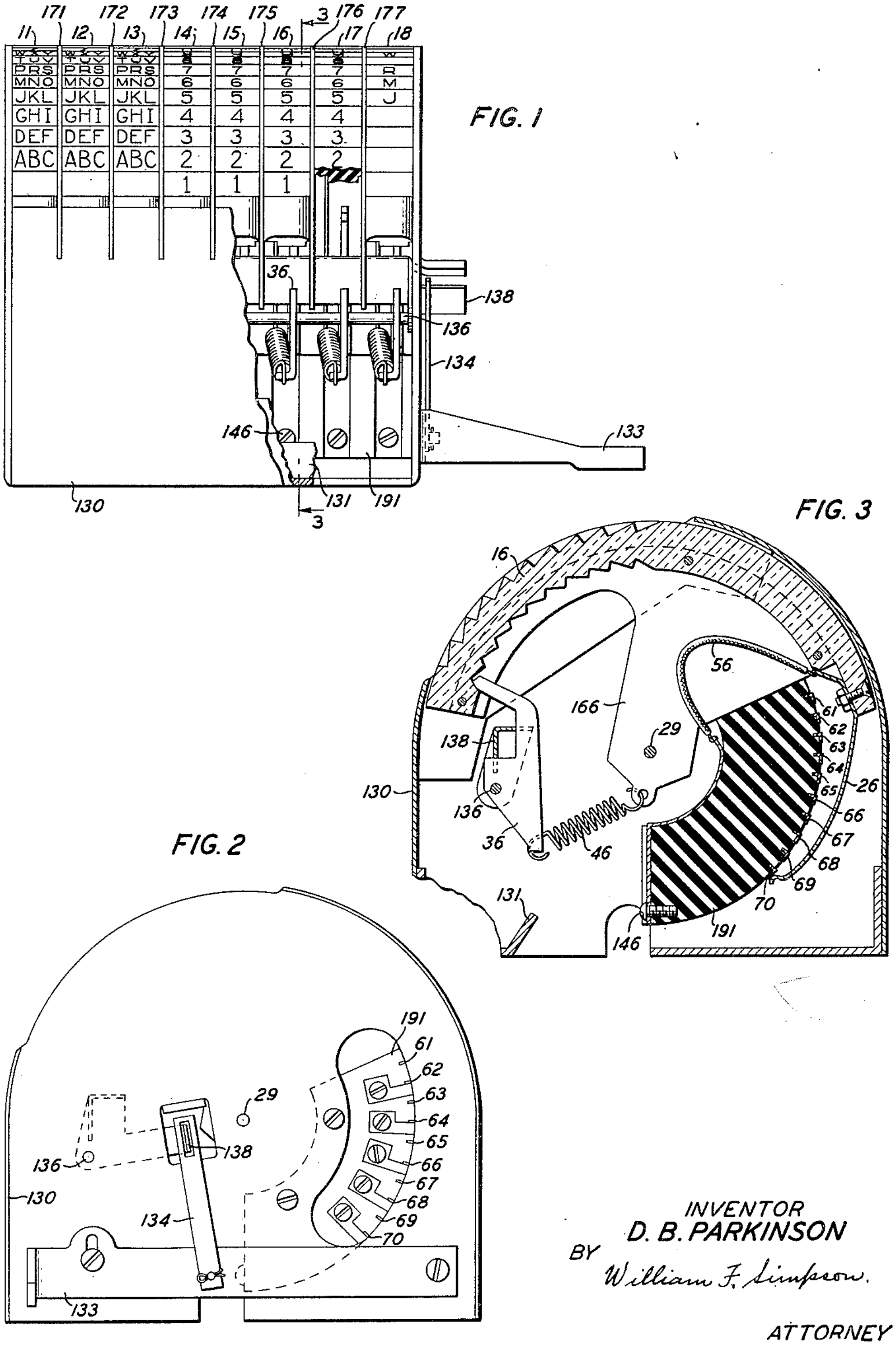
Fig. 1 is a front view, partially broken away, of the dialing apparatus.
Fig. 2 is a side view of the same apparatus.
Fig. 3 shows a section taken along section line 3 of Fig. 1.

Figs. 1, 2 and 3 indicate one embodiment of the selector switch. It is enclosed in case 130, and selector dials 11 to 18 and release lever 133 are accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl to secure each dial in one of the ten possible positions as selected by the operator. As indicated in Fig. 3, detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations in a dial an operator can move the dial in either direction and so that the ratchet action of the pawl against the grooves secures the dial in any one of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction about shaft 136 and the detent pawls are disengaged from the dials, thereby permitting the spring associated with each dial to cause each dial to return to its initial position.

A spring contact is connected to each dial, and each dial and spring contact may be moved so that the spring contacts may be connected with any one of ten conductors. As indicated in Fig. 3, spring contact 26 is attached to dial 16 and it is electrically connected to terminal 146 through conductor 56. Insulator 191 supports the various terminals and conductors, and the ten conductors 61 to 70 which may be contacted by spring contacts 21 to 28 are mounted thereon.

Figs. 5, 6, 7, 8 and 9 indicate one embodiment of the stepping device and distributor. The distributor comprises two brushes 113 moving over a set of contacts. Contacts 91 to 98 and the eight contacts bonded by conductor 114 serve as distributor elements. The brushes are driven by ratchet wheel 206 through shaft 207. The ratchet wheel is driven by stepping pawls 208 and 209 which are attached to magnetic reed 210. The magnetic structure is polarized by permanent magnet 212 and magnetic reed 210 is actuated by coil 211. When an alternating current is applied to coil 211, the magnetic polarity of reed 210 is changed each half cycle of the alternating current so that the reed moves both upward and downward during each cycle of the alternating current. Each time reed 210 moves upward or downward ratchet wheel 206 is moved one step by one of the stepping pawls. Thus, ratchet wheel 206 and rotor 113 are moved one step during each half cycle of the alternating current.

Figure 4:
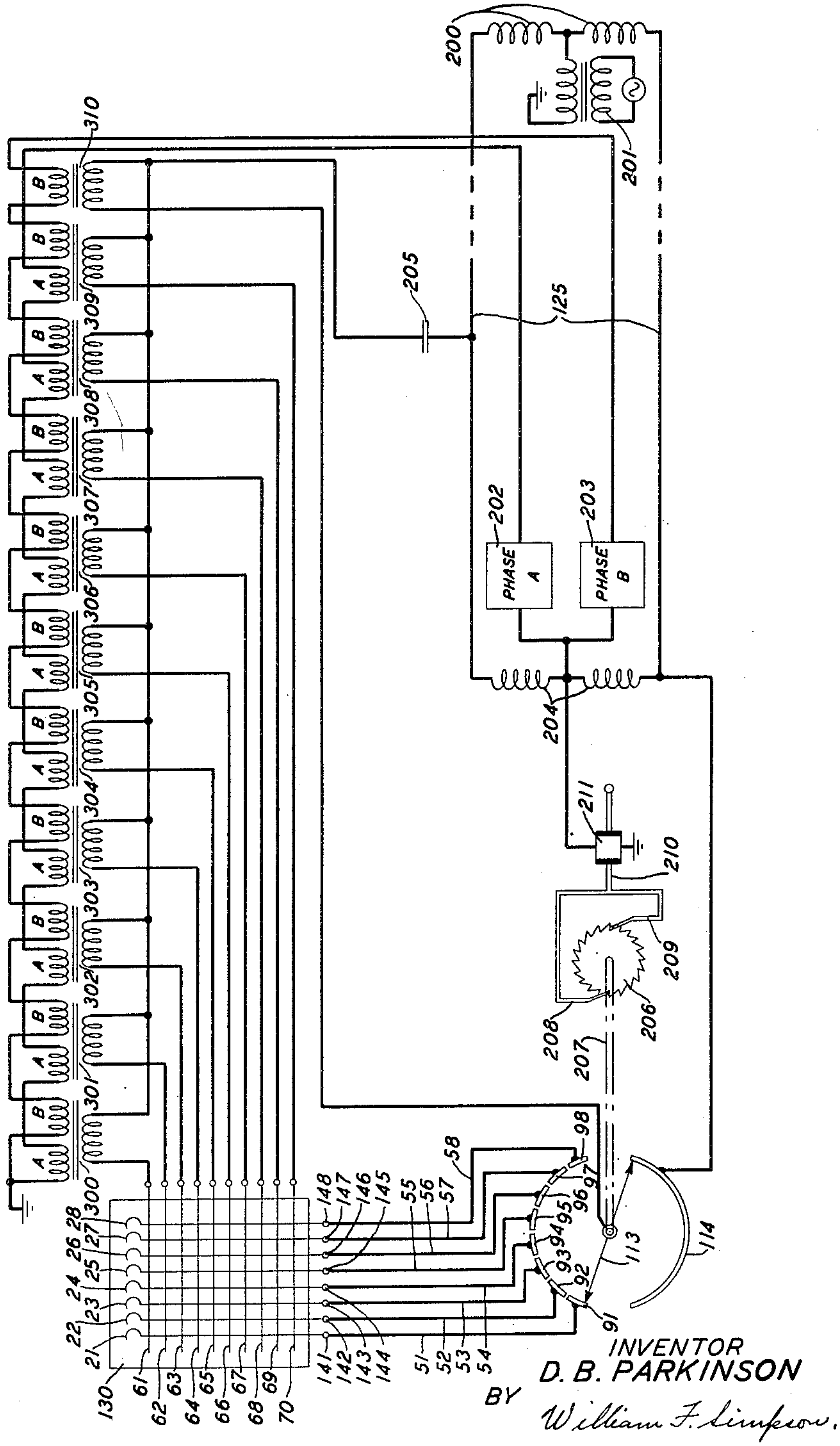
Fig. 4 shows the manner in which the dial, the stepping mechanism, the pulsing transformers, and other equipment are interconnected to cooperate one with another and with the telephone line.
Figure 5:
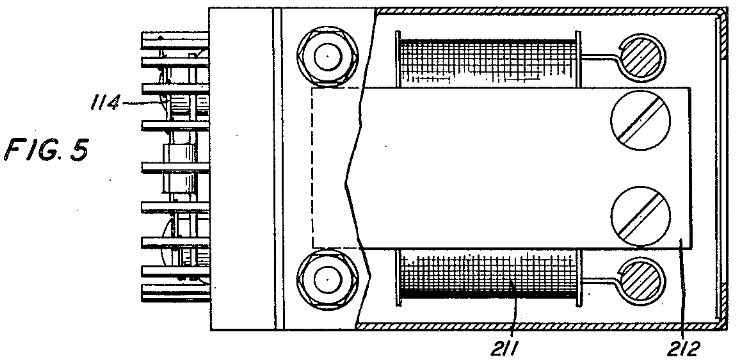
Fig. 5 is a top view, partially broken away, of the stepping mechanism.
Figure 7:
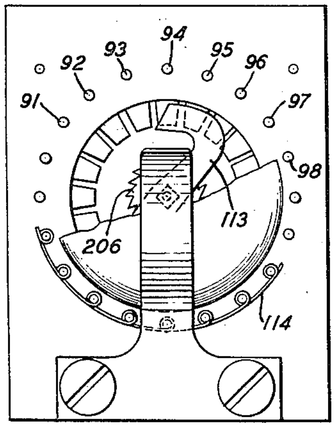
Fig. 7 is a front view, partially broken away, of the stepping mechanism.
Figure 6:
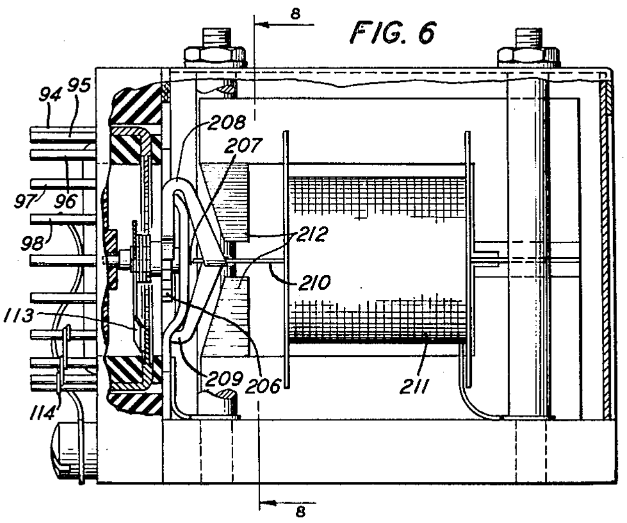
Fig. 6 is a side view, partially broken away, of the stepping mechanism.
Figure 8:
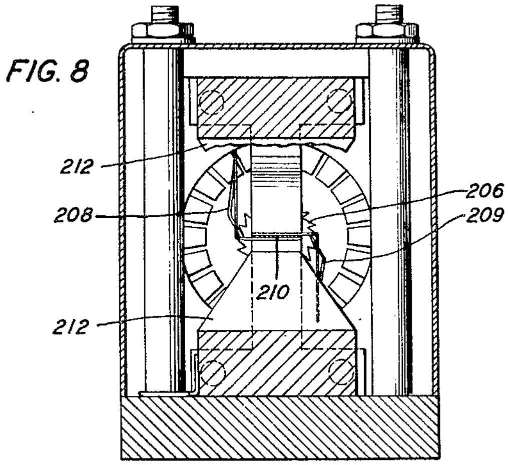
Fig. 8 shows a section, partially broken away, taken along section line 8 of Fig. 6.
Figure 9:
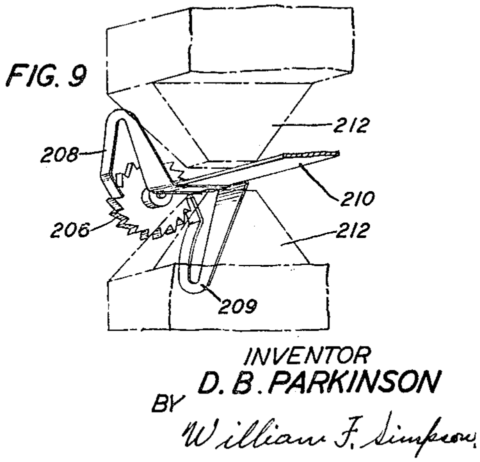
Fig. 9 is a partial disclosure of the stepping mechanism showing the pole-pieces, the armature and stepping pawls, and the ratchet wheel.

In the embodiment of this invention shown in Fig. 4, the alternating current to energize the stepping device and provide the excitation current for the pulsing transformers is supplied through a simplex circuit. The alternating current is applied between the two line conductors 125 and ground. The interconnection between the source of alternating current and the two line conductors is simplex coil 200 having similar electrical properties to simplex coil 204. The source of alternating current is connected between the center tap of coil 200 and ground through transformer 201. Thus, the potential between the center tap of coil 204 and ground corresponds to the potential developed across the secondary of transformer 201. In this manner the alternating current to operate the stepping mechanism and to serve as the excitation current for the pulsing transformers is transmitted over the telephone line.

It will be observed that the excitation current could be supplied locally rather than over the telephone line if desired.

Pulsing transformers 300 to 310 are interconnected so that the A windings of the transformers are connected in series and connected to the excitation current through phase shifting network 202 and so that the B windings of the transformers are connected in series and connected to the excitation current through phase shifting network 203. The phase shifting networks are of conventional design and serve to apply an alternating current to the A windings of the transformers which is displaced 90 degrees in time-phase relationship from the alternating current applied to the B windings of the transformers. Transformers 300 to 309 contain two primary windings and these transformers serve to generate the stop or digit pulses. Transformer 310 has one primary winding and serves to generate the reference or start pulses. It will be observed that substantially the same result can be achieved by employing two primary windings on transformer 310.

As discussed hereinbefore, each of the transformers 300 to 310 is designed so that its core is saturated except for very small values of flux. Thus, a short pulse is generated in the secondary winding of each transformer when the flux in the core of that transformer passes through zero magnitude. Since transformer 310 is connected to only one phase of the excitation current, the ampere-turns for that transformer will be in phase with the excitation current supplied through network 203 and consequently a pulse will be generated in the secondary winding of the transformer each time the excitation current supplied through network 203 passes through zero magnitude. In this way two start or reference pulses are generated during each cycle of the excitation current. Fig. 10 indicates the various pulse positions as a function of time. Fig. 10A indicates the ampere-turns generated in transformer 310 as a function of time and shows the time-phase relationship between the start pulses and the ampere-turns generated in the transformer.

Since transformers 300 to 309 are connected to both phases of the excitation current, the ampere-turns generated in each transformer will equal the summation of the ampere-turns generated by each phase winding. As discussed hereinbefore, since the maximum value of the current in each phase is equal and since the time-phase relationship between the two alternating currents is fixed, the time at which the summation of the ampere-turns and consequently the flux in each transformer passes through zero magnitude is governed by the number of turns in each phase winding. Fig. 10B indicates the ampere-turns generated in each phase winding of transformer 301 as a function of time and shows the time-phase relationship between the stop pulses representing the digit 1 and the ampere-turns generated in each phase winding. Figs. 10C and 10D indicate the time-phase relationships for the generation of stop pulses representing the digits 2 and 0, respectively. In each case a stop or digit pulse is generated when the summation of the ampere-turns in both windings equals zero, in each case two pulses are generated during each complete cycle, and in each case each successive pulse is opposite polarity to the preceding pulse as generated by the same transformer. It will be apparent that the particular phase relationships indicated are arbitrary and that other relationships would serve equally well.

Each pulsing transformer is connected to line 125 through condenser 205. This condenser is proportioned to the iterative impedance of the line so that $$RC << T$$

where R is the resistance component of the iterative impedance, C is the capacitance of condenser 205, and T is the time required for each pulse as generated by the transformers. When the circuit constants are proportioned in this manner a so-called differentiating circuit is formed. In this embodiment of the invention the resistance and capacitance are proportioned so that each half-cycle pulse as generated by a transformer is applied through condenser 205 to the line as a complete cycle of alternating current of sinusodal waveform, and the period of each complete cycle of alternating current is equal to the time required for each half-cycle pulse as generated by the transformers.

Fig. 10E indicates the start pulses and pulses representing the digit 2 as applied to the line during one cycle of the excitation current. Fig. 10E in conjunction with Figs. 10A and 10C indicates the relationship between the pulses as generated in the transformers and the pulses as applied to the line.

An excitation current which alternates at 40 cycles per second is employed for this embodiment of the invention; however it will be apparent that other frequencies within the voice frequency range would serve equally well.

The primary windings of each of the transformers 300 to 309 are proportioned so that each transformer generates a stop pulse corresponding to the digit assigned to that transformer. Thus, each of these transformers generates a pulse which reaches its peak value at a time during the 4½ milliseconds interval assigned to stop or digit pulses and there is a ½ millisecond time interval between the peak values of each pulse generated.

During the time that the excitation current is applied to the pulsing transformers a pulse is generated in the secondary of each of the transformers during each half cycle of the excitation current. In order to apply the pulses to line 125 in conformity with the called number which it is desired to transmit, selector switch 130 and the distributor are employed to interconnect the transformers with the line.

The secondary of transformer 310 is connected across line 125 through condenser 205 and rotor 113 of the distributor. The distributor is constructed so that during each cycle of operation rotor 113 connects with line 125 through conductor 114 during the time required for stepping wheel 206 to move eight steps, and so that rotor 113 is not connected with the line during the time required for stepping wheel 206 to move two steps. In this manner the secondary of transformer 310 is repeatedly connected across line 125 during 100 milliseconds intervals and each interval during which the transformer is disconnected is 25 milliseconds in duration. Since a start or reference pulse is generated in transformer 310 at 12½ milliseconds intervals, it follows that eight start pulses are impressed across line 125 during each 100 millisecond interval in which rotor 113 connects with conductor 114.

The secondaries of transformers 300 to 309 are connected across line 125 through condenser 205 and through the selector switch and distributor. The distributor is designed so that rotor 113 connects with each of the conducting segments 91 to 98 during each half rotation. The segments are positioned so that the rotor steps from one segment to the next each time stepping wheel 206 moves one step, and during each half rotation the rotor does not contact any of the segments during a 25 milliseconds interval. Thus, during eight 12½ milliseconds intervals the rotor successively connects with each of the segments. Since each conducting segment is connected with a spring contact in the selector switch and since each spring contact may be selectively connected with the secondary of any one of transformers 300 to 309, the secondary of any one of these transformers may be selectively connected across the line during each of the 12½ milliseconds intervals during which rotor 113 connects with a conducting segment. It will be observed that this method of selectively connecting the pulsing transformers across the line determines the time relationship of each stop pulse with reference to the start pulse with which it cooperates. No pulses are applied to the line during the 25 milliseconds interval in which rotor 113 is disconnected from conductor 114, and, as discussed hereinbefore, this interval during which no pulses are transmitted allows the position of the various characters in the number to be recognized and enables the central switching equipment to properly respond to the number.

When the stepping mechanism is deenergized rotor 113 may stop in any position around its shaft. Consequently, rotor 113 may start from any position with reference to the distributor segments and, as a result, the first series of pulses transmitted will not ordinarily represent the complete number which is to be called. As discussed in copending application Serial No. 35,925 of W. A. Malthaner, the central office switching equipment is designed to reject the signaling pulses unless the correct number of pulses is received between each no-signal period. Also, the no-signal period preceding each group of pulses must be of a certain duration before the central office equipment will respond.

The signaling apparatus disclosed herein may be used as part of a subscriber's telephone station or as part of a central office operator's equipment. Ordinarily it will be desirable to interpose a manually operable switch between the apparatus as disclosed and the telephone line. This switch would serve to place the station in condition to receive a call when in its normal position, and to place the station in condition to generate and transmit signaling pulses when in its operated position. It is apparent that the selector switch 130 could be modified so as to include a telephone handset cradle and switch of conventional design. In this case the switch would be in its normal unoperated condition while the handset is resting in its cradle, and it would be operated when the handset is removed.

Under some circumstances it may be desirable to provide for the continuous energization of the pulsing transformers and employ a separate switch for connecting the pulsing transformers across the line.

In using the signaling apparatus the subscriber or operator will first position dials 11 to 18 so that the number to be called appears on a horizontal line slightly above the front face of case 130. It is to be observed that the operator has this number before him at all times and may check it at any time before, during, or after the call. The operator will then cause the signaling pulses to be transmitted by switching the signaling apparatus across the line.

While the stepping mechanism and pulsing transformers are energized a series of start pulses will be transmitted and each start pulse will be followed by a stop pulse as determined by the setting of selector switch 130. Each series of signaling pulses representing a called number will be interrupted by a no-signal interval of time of predetermined duration. As long as the stepping device and the pulsing transformers are energized they will cause pulses representing the called number to be continuously repeated and transmitted over the line.

These pulses are transmitted over the line to a central switching station where they are received and recorded by equipment such as disclosed in copending application Serial No. 35,911 of H. E. Vaughan or Serial No. 35,924 of W. A. Malthaner, N. D. Newby, and H. E. Vaughan. At the completion of the setting up of a path to a called station, the circuits of the called station and the central office will operate in a manner similar to that set forth in copending application Serial No. 35,925 of W. A. Malthaner, which circuits function to disconnect the pulse generating equipment from the line and connect the calling station's telephone circuit to the line. In addition the excitation current for the stepping device and pulsing transformers may be stopped at this time if it is so desired. At the completion of the call or before the next call is made the dials are returned to their normal position as indicated in Fig. 1 by pressing release lever 133. After this has been done the apparatus is again in condition to be positioned and operated as discussed above.

The type transformers 301, 302, etc., utilized in this invention are known as pulse or impulse transformers, such name being derived from their characteristic of producing a short pulse or impulse in the secondary when ordinary alternating current is supplied to the primaries thereof. In the exemplary embodiment of the invention incorporated in this specification the impulse generating transformers each have two primary windings and having alternating currents of different phase supplied to them; the transformers being so designed that a pulse is generated in the secondaries only when the total flux in the primaries passes through zero magnitude.

Although a specific embodiment of this invention has been shown and described, it will be understood that modifications may be made therein without departing from the scope and spirit thereof as defined by the appended claims.

What is claimed is:

1. A signaling apparatus comprising an electric line, a plurality of pulsing transformers, means for generating a polyphase alternating current to excite said transformers, and means for selectively connecting the output of a plurality of said transformers across said line during predetermined half cycles of said alternating current.

2. A signaling apparatus comprising an electric line, a plurality of pulsing transformers, means for generating a polyphase alternating current to excite said transformers, means for connecting the output of one of said transformers across said line at a plurality of regularly recurring intervals of time, and means for selectively connecting the output of predetermined ones of the remaining transformers across said line at predetermined times during each of said intervals of time.

3. A signaling apparatus comprising an electric line, a transformer for generating first pulses, a plurality of transformers for generating second pulses, means for generating a polyphase alternating current to excite said transformers, means for connecting the output of said transformer for generating first pulses across said line during a predetermined number of cycles of said polyphase alternating current, and means for selectively connecting the output of one of said transformers for generating second pulses across said line during each half cycle of said predetermined number of cycles of polyphase alternating current.

4. In a telephone system comprising a telephone line, dialing apparatus comprising a plurality of pulsing transformers, means for generating a two-phase alternating current to excite said pulsing transformers, a stepping mechanism operative from said alternating current transmitted over said line, a distributor under the control of said stepping mechanism, and interconnecting means including said distributor between the output of said transformers and said line.

5. In a telephone system comprising a telephone line, dialing apparatus comprising a plurality of pulsing transformers, means for generating a two-phase alternating current to excite said pulsing transformers, a distributor, a selector switch for interconnecting the output windings of said transformers with said distributor, means including said distributor for connecting the output winding of one of said transformers to said line during a predetermined number of cycles of said alternating current, and means including said distributor and selector switch for selectively connecting the output winding of one of the remaining transformers to said line during each half cycle of said predetermined number of cycles of alternating current.

6. A signaling apparatus comprising an electric line, a plurality of impulse transformers comprising two primary windings and one secondary winding for each transformer, one start impulse transformer comprising one primary winding and a secondary winding, all of said first primary windings being energized by a current of a given phase, all of said second primary windings, and said primary winding of said start impulse transformer being energized by a current of a different phase, the individual transformers each having the number of turns in their respective primary windings so proportioned as to produce a pulse at a definite interval of time from the pulse produced by said start impulse transformer, digit control means for selectively connecting said start impulse transformer and any one of said other impulse transformers to said line incident to the selection of a digit to be transmitted, and means whereby a pair of pulses characteristic of said digit are transmitted incident to a setting of said selectable means.

7. A signaling apparatus comprising a telephone line, a plurality of impulse transformers, means to generate a polyphase current to excite said impulse transformers, a distributor, a digit control selectable means for selectively connecting pairs of said transformers to said distributor so as to transmit a series of pairs of electrical impulses through said distributor and over said telephone line.

8. A signaling apparatus comprising a telephone line, a plurality of impulse transformers, current generating means to excite said transformers, a distributor, a digit control selectable means for selectively connecting pairs of transformers to said distributor so as to transmit a series of pairs of electrical pulses through said distributor and over said telephone line, said impulse transformers comprising a start impulse transformer and a plurality of other transformers adapted to generate pulses having definite and predetermined time relations with the pulse from said start impulse transformer.

9. A signaling apparatus comprising a telephone line, a plurality of impulse transformers, current generating means to excite said transformers, a distributor, a digit control selectable means for selectively connecting pairs of transformers to said distributors so as to transmit a series of pairs of electrical pulses through said distributor and over said telephone line, said impulse transformers comprising a start impulse transformer and a plurality of other impulse generating transformers adapted to generating electrical pulses having definite and predetermined time relations with the pulse from said start impulse transformer, said other impulse generating transformers each comprising two primary windings and one secondary winding.

10. A signaling apparatus comprising a telephone line, a plurality of impulse transformers, a distributor, a digit control selectable means for selectively connecting pairs of transformers to said distributor so as to transmit a series of pairs of electrical impulses through said distributor and over said telephone line, said impulse transformers comprising a start impulse transformer and a plurality of other impulse generating transformers, said other impulse generating transformers each comprising two primary windings and one secondary winding, a first alternating-current source to energize one of the primary windings of all of said other impulse generating transformers, a second alternating-current source of the same frequency as said first alternating-current source but being out of phase therewith to energize the other of the primary windings of said impulse generating transformers and also the primary winding of said start impulse transformer.

11. A plurality of transformers, digit control means for presetting a plurality of pairs of impulse transformers, one of said transformers having one primary winding and a secondary winding, the remainder of said plurality of transformers each comprising two primary windings and a secondary winding, each transformer having its core saturable with such a low value of ampere turns that an electric pulse is generated in the secondary winding thereof only when the algebraic sum of the ampere turns of the primary windings thereof becomes substantially zero, means for exciting said transformers with a polyphase alternating current, one phase of said polyphase alternating current being applied to each of one of the primary windings of said remainder of said plurality of transformers, the other phase of said polyphase alternating current being applied to the remainder of the primary windings of said plurality of transformers, and a distributor to distribute the impulses generated by said plurality of pairs of impulse transformers over said telephone line.

12. A plurality of transformers, digit control means for presetting a plurality of pairs of impulse transformers, one of said transformers having one primary winding and a secondary winding, the remainder of said plurality of transformers each comprising two primary windings and a secondary winding, each transformer having its core saturable with such a low value of ampere turns that an electric impulse is generated in the secondary thereof only when the algebraic sum of the ampere turns of the primary windings thereof becomes substantially zero, means for exciting said transformers with a two-phase alternating current, and means for generating electric signaling pulses at predetermined times by proportioning the magnetic flux generated in each primary winding of each transformer by each phase of said alternating current in said transformer.

13. In a telephone system comprising a voice frequency transmission path, dialing apparatus comprising a plurality of impulse transformers, means for generating a polyphase alternating current to excite said impulse transformers, said polyphase alternating current being transmitted over said voice frequency transmission path, and interconnecting means comprising a distributor and a digit control selectable means between the output of said transformers and said transmission path adapted to selectively connect pairs of transformers to said distributor so as to transmit a series of pairs of electrical impulses through said distributor and over said transmission path, the interval of time between the occurrence of the first and second pulse of each pair of impulses serving to designate one digit of a called number.

14. A signaling apparatus comprising an electric line, a plurality of impulse transformers, means for generating a polyphase current to individually excite the various impulse transformers, digit control selectable means for selectively connecting a pair of said transformers to said line incident to the selection of a digit to be transmitted, and distributor means adapted to transmit a pair of pulses characteristic of said digit incident to a setting of said selectable means.

DAVID B. PARKINSON.

REFERENCES CITED

The following references are of record in the file of this patent:

UNITED STATES PATENTS

| Number | Name | Date |
|---|---|---|
| 548,406 | Thomson | Oct. 22, 1895 |
| 1,966,315 | Silicoeo | July 10, 1934 |
| 1,972,289 | Chanveau | Sept. 4, 1934 |
| 2,036,037 | Goff | Mar. 31, 1936 |
| 2,072,572 | Vanhierswynhels | Mar. 2, 1937 |
| 2,085,884 | Wilkinson | July 6, 1937 |
| 2,100,390 | Goff | Nov. 30, 1937 |
| 2,252,766 | Holden | Aug. 19, 1941 |
| 2,396,211 | Skillet | Mar. 5, 1946 |
| 2,448,812 | Lemire | Sept. 7, 1948 |